United States Patent
Kudou et al.

(10) Patent No.: US 6,240,724 B1
(45) Date of Patent: Jun. 5, 2001

(54) CONTROL DEVICE FOR DIRECT INJECTION ENGINE

(75) Inventors: Hidetoshi Kudou; Hiroyuki Yamashita; Fumihiko Saito; Mikihito Fujii; Masakazu Matsumoto, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/365,722

(22) Filed: Aug. 3, 1999

(30) Foreign Application Priority Data

Aug. 6, 1998 (JP) .................................. 10-223436

(51) Int. Cl.$^7$ ..................................... F01N 3/00
(52) U.S. Cl. ...................... 60/284; 60/285; 60/286; 123/478
(58) Field of Search .................. 60/284, 285, 286; 123/295, 478, 276

(56) References Cited

U.S. PATENT DOCUMENTS

| 5,170,759 | * | 12/1992 | Ito | 123/276 |
| 5,313,920 | * | 5/1994 | Matsushita et al. | 123/295 |
| 5,655,365 | | 8/1997 | Worth et al. | |
| 5,832,901 | * | 11/1998 | Yoshida et al. | 123/478 |
| 6,032,637 | * | 3/2000 | Mamiya et al. | 123/295 |
| 6,062,201 | * | 5/2000 | Nozowa et al. | 123/478 |

FOREIGN PATENT DOCUMENTS

404292543A * 10/1992 (JP) .

* cited by examiner

Primary Examiner—Thomas Denion
Assistant Examiner—Thai-Ba Trieu
(74) Attorney, Agent, or Firm—Nixon, Peabody, LLP; Donald R. Studebaker

(57) ABSTRACT

A control device for a direct injection engine having a catalyst provided in an exhaust passage for converting exhaust gases and an injector for injecting fuel directly into a combustion chamber, includes a temperature state identifier for judging the temperature state of the catalyst, a load condition detector for sensing engine load conditions, and a fuel injection controller for controlling fuel injection from the injector. The fuel injection controller performs quick light-off control operation by causing the injector to inject fuel in one-time injection mode during a compression stroke in a specific low-load operating range of the engine when the catalyst is in its unheated state where its temperature is below its activation temperature, and switching the mode of fuel injection to intake-compression stroke split injection mode in a specific high-load operating range of the engine.

11 Claims, 13 Drawing Sheets

CONTROL DEVICE FOR DIRECT INJECTION ENGINE

This application is based on patent application No. 10-223436 filed in Japan, the contents of which are hereby incorporated by references.

BACKGROUND OF THE INVENTION

This invention relates to control of fuel injection during a period when a catalytic converter is not heated yet in a direct injection engine provided with an injector which injects fuel directly into a combustion chamber.

The type of direct injection engine having a fuel injector which injects fuel directly into the combustion chamber is known in the prior art. Unlike other conventional arrangement in which an injector is provided in an intake passage, the direct injection engine does not cause a problem of fuel condensation on passage walls. Therefore, it provides excellent stability and response characteristics with respect to air-fuel ratio control. In addition, if the combustion chamber is designed in such a shape that an air-fuel mixture is locally distributed around a spark plug when the fuel is injected in the latter half of each compression stroke, it is possible to make the mixture leaner (higher air-fuel ratio) as a whole by using so-called stratified charge technology and thereby achieve an improvement in fuel economy.

Exhaust gases from automotive engines, for instance, contain hydrocarbons (HC), carbon monoxide (CO) and nitrogen oxides (NOx). There is a demand today to reduce generation and release of these harmful constituents as much as possible to obtain improved properties of automotive emissions. One approach that has conventionally been practiced is to provide a catalyst in an exhaust passage, as is widely done in the direct injection engine.

However, catalysts used for converting the exhaust gases can not fully exhibit their conversion effects in a cold-start condition when the catalysts are at a temperature lower than their activation temperature and, therefore, considerable quantities of HC and NOx constituents are likely to be released if it takes a long time for the catalysts to reach the activation temperature.

A device intended to provide means for overcoming this problem is disclosed in U.S. Pat. No. 5,655,365, for example. This device delays the ignition timing of at least one cylinder to a point beyond its top dead center and increases the ratio of fuel to a higher level than required when the engine is in its normal operating condition while a catalyst is not heated yet. As a result, the exhaust gas temperature is increased, so that heating of the catalyst is promoted. When applied to a direct injection engine, the device injects a specified amount of fuel completely during a particular period before the top dead center (e.g., 60° to 80° before the top dead center, hereinafter referred to as BTDC) in each compression stroke.

The device disclosed in the Patent Publication promotes quick light-off mainly by retarding the ignition timing while supplying an excess amount of fuel during the period when the catalyst is not heated yet, and in controlling fuel injection from an injector in the direct injection engine, the device injects the fuel only in each compression stroke. If fuel injection is controlled in this manner, however, the fuel economy significantly deteriorates when engine load increases and the amount of injected fuel increases, for example, although sufficient effects are not obtained with respect to the reduction in HC and NOx emissions and increase in the exhaust gas temperature. Thus, there is left room for improvements in this device.

SUMMARY OF THE INVENTION

It is an object of the invention to provide a control device for a direct injection engine which has overcome the problems residing in the prior art.

It is another object of the invention to provide a control device for a direct injection engine which can improve the properties of emissions by cutting down HC and NOx contents while reducing deterioration in fuel economy to a relatively low level from low-load to high-load engine states and can increase quick light-off effect due to an increase in exhaust gas temperature.

According to an aspect of the invention, a control device for a direct injection engine having a catalyst provided in an exhaust passage for converting exhaust gases and an injector for injecting fuel directly into a combustion chamber comprises a temperature state identifier for judging the temperature state of the catalyst, a load condition detector for sensing engine load conditions, and a fuel injection controller for controlling fuel injection from the injector. The fuel injection controller performs quick light-off control operation by causing the injector to inject fuel in one-time injection mode during a compression stroke in a specific low-load operating range of the engine when the catalyst is in its unheated state where its temperature is below its activation temperature, and switching the mode of fuel injection to intake-compression stroke split injection mode which includes earlier injection made during an intake stroke and later injection made during the compression stroke in a specific high-load operating range of the engine, based on judgment results of the temperature state identifier and sensing results of the load condition detector.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

A preferred embodiment of the invention is now described referring to the accompanying drawings.

Figure 1:
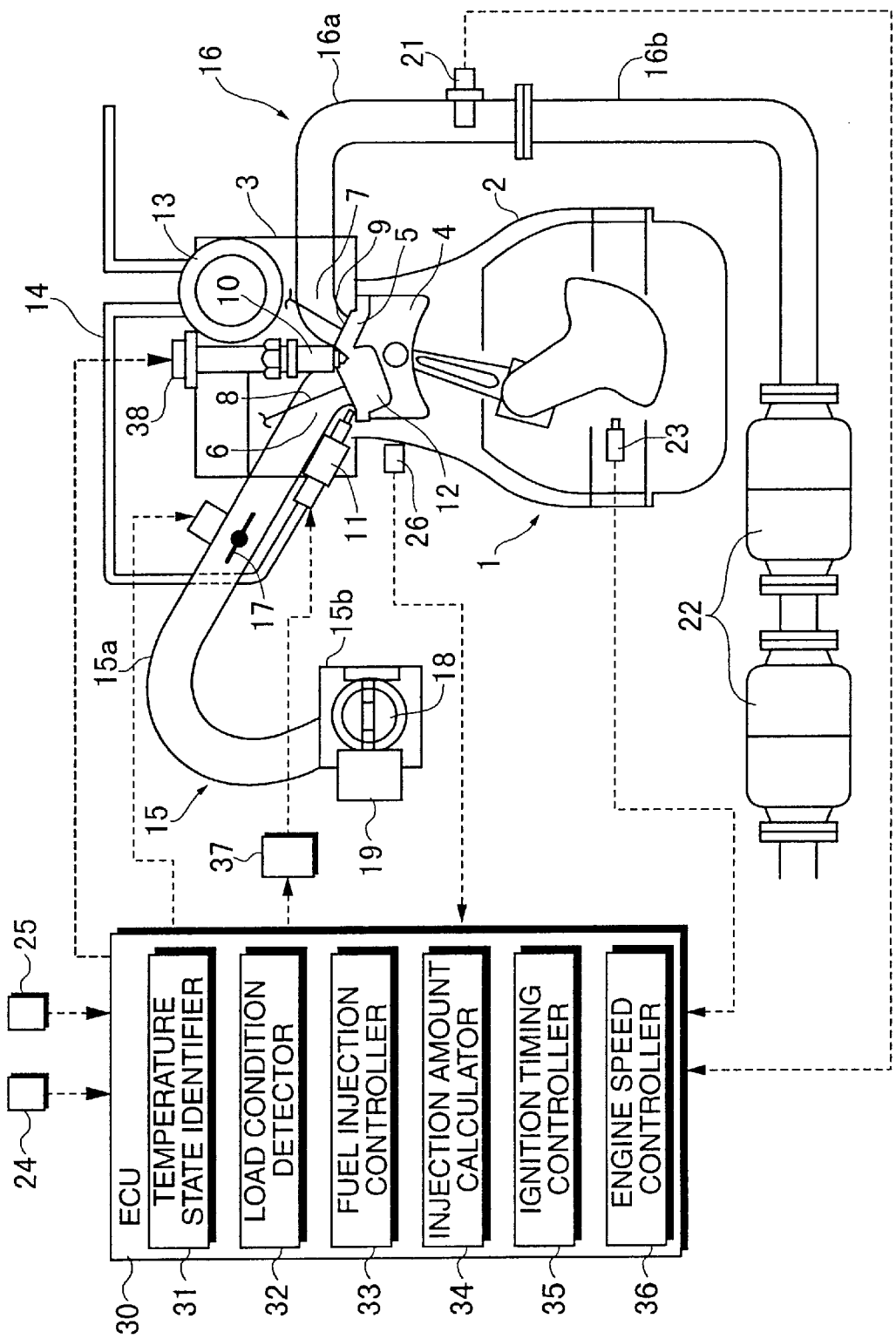
FIG. 1 is a general configuration diagram showing a direct injection engine according to an embodiment of the invention.

FIG. 1 is a general configuration diagram showing a direct injection engine according to the embodiment. In FIG. 1, the reference numeral 1 designates a main engine body which includes a cylinder block 2 and a cylinder head 3 in which a plurality of cylinders are formed. A piston 4 is fitted in each cylinder and a combustion chamber 5 is formed between the top surface of the piston 4 and the bottom surface of the cylinder head 3.

A recess having a particular shape is formed in the bottom surface of the cylinder head 3 and this recess forms an upper interior surface of the combustion chamber 5. Intake ports 6 and exhaust ports 7 opening into the combustion chamber 5 are formed in its upper interior surface. Although one each intake port 6 and exhaust port 7 are shown in FIG. 1, two each intake ports 6 and exhaust ports 7, individually arranged in a direction perpendicular to the page of FIG. 1, are provided in a preferred form of the invention, in which an intake valve 8 is provided in each intake port 6 while an exhaust valve 9 is provided in each exhaust port 7. Driven by an unillustrated valve actuator, the intake valves 8 and the exhaust valves 9 are caused to open and close with properly controlled timing.

Spark plugs 10 are fitted in the cylinder head 3 in such a way that each spark plug 10 is located approximately at the middle of the combustion chamber 5 with its spark gap located in the inner space of the combustion chamber 5.

An injector 11 which injects fuel directly into the combustion chamber 5 is provided at a peripheral part of the combustion chamber 5. In the embodiment shown in FIG. 1, the injector 11 is attached to the cylinder head 3 at the side of the combustion chamber 5 near the intake port 6. The injector 11 is mounted such that it injects the fuel obliquely downward with the far end of the injector 11 located in the inner space of the combustion chamber 5.

Also in the illustrated embodiment, a cavity 12 having a U-shaped cross section is formed in the top of the piston 4 which constitutes the bottom of the combustion chamber 5. The location and direction of the injector 11, the location of the cavity 12 and the location of the spark plug 10 are predetermined to satisfy a particular relationship in such a way that when the fuel is injected from the injector 11 in the latter half of each compression stroke where the piston 4 approaches its top dead center, the fuel is sprayed into the cavity 12, redirected by the cavity 12 and eventually reaches the spark plug 10.

A high-pressure pump 13 is connected to the injector 11 through a fuel-feeding passage 14. The high-pressure pump 13 and an unillustrated high-pressure regulator which is connected to the high-pressure pump 13 by a return passage jointly adjust fuel pressure exerted on the injector 11 to such a pressure level that is sufficiently high to enable fuel injection during middle and later portions of the compression stroke.

An intake passage 15 and an exhaust passage 16 are connected to the main engine body 1. The intake passage 15 branches out downstream of a surge tank 15b to the individual cylinders. In this embodiment, two branched passage 15a (of which only one is shown in FIG. 1) running parallel to each other are provided for each cylinder. A swirl control valve 17 for enhancing turbulence within the combustion chamber 5 is provided in one of these branched passages 15a, and the two intake ports 6 at the downstream ends of the branched passages 15a open into the combustion chamber 5. When the swirl control valve 17 in one branched passage 15a is closed, a swirl is produced in the combustion chamber 5 by intake air inducted through the other branched passage 15a so that the gas turbulence within the combustion chamber 5 is enhanced.

As an alternative means for enhancing turbulence within the combustion chamber, a valve which produces a tumble may be provided in one branched passage instead of the swirl control valve 17, or there may be made such an arrangement that a squish is produced between the top surface of the piston and the upper interior surface of the combustion chamber (bottom surface of the cylinder head) near the top dead center in the compression stroke.

Further, a throttle valve 18 is provided halfway in the intake passage 15 and this throttle valve 18 is made controllable by an electrically driven actuator 19 like a stepper motor to permit control of the amount of intake air.

Although not specifically illustrated, the surge tank 15b is connected to an exhaust gas recirculation (EGR) passage via an EGR valve to make it possible to introduce EGR gas upon completion of engine warm-up.

On the other hand, an $O_2$ sensor 21 and a catalytic converter 22 containing catalysts for converting exhaust gases are provided in the exhaust passage 16. The $O_2$ sensor 21 is made of a sensor ($\lambda O_2$ sensor) whose output varies at a theoretical, or stoichiometric, air-fuel ratio and detects the air-fuel ratio of a mixture in the combustion chamber 5 by measuring the concentration of oxygen.

While the catalytic converter 22 may be formed of a three-way catalyst, it is desirable to use catalysts capable of reducing NOx contained even in a lean mixture having a higher air-fuel ratio than the stoichiometric air-fuel ratio in order to provide increased conversion efficiency when performing stratified charge combustion of a lean mixture of a high air-fuel ratio, as will be described later. More specifically, while the three-way catalyst exhibits high conversion efficiency against all three pollutants HC, CO, only in a narrow range of air-fuel ratio around the stoichiometric air-fuel ratio as is commonly known, there exists a catalyst (NOx catalyst for lean mixture treatment) which not only performs the same function as the three-way catalyst but also reduces the amount of NOx contained even in a lean mixture having a higher air-fuel ratio than the stoichiometric air-fuel ratio. Thus, it is preferable to reduce the amount of NOx by using such catalyst under lean operating conditions. It is to be noted, however, that this kind of NOx catalyst for lean mixture treatment also exhibits its maximum conversion efficiency in a range around the stoichiometric air-fuel ratio.

Since the catalytic converter 22 contains the NOx catalyst for lean mixture treatment, the catalyst temperature is likely to increase excessively under high-speed, high-load conditions if the catalytic converter 22 is provided immediately downstream of an exhaust manifold 16a (or directly connected to the exhaust manifold 16a). Therefore, the catalytic converter 22 is connected to an exhaust pipe 16b which is connected to the exhaust manifold 16a so that the catalytic converter 22 is situated farther away from the main engine body 1 than the position immediately downstream of the exhaust manifold 16a. In a case where the three-way catalyst is used, however, the catalytic converter 22 may be connected directly to the exhaust manifold 16a because the three-way catalyst has heat-resistant properties.

Designated by the numeral 30 in FIG. 1 is an electronic control unit (ECU) which performs engine control. The ECU 30 receives signals from various sensing devices, such as a crank angle sensor 23 which detects the crank angle of the engine, an acceleration sensor 24 which detects accelerator opening (i.e., the amount of operation of an accelerator pedal), an airflow meter 25 which detects the amount of intake air, a water temperature sensor 26 which detects the temperature of engine cooling water and the $O_2$ sensor 21.

The ECU 30 includes a temperature state identifier 31, a load condition detector 32, a fuel injection controller 33, an injection amount calculator 34, an ignition timing controller 35 and an engine speed controller 36.

The temperature state identifier 31 estimates the temperature state of the catalyst and judges whether it is in an unheated state, or its temperature is lower than its activation temperature, based on a temperature sensing signal fed from the water temperature sensor 26. If the water temperature is lower than a set temperature, the temperature state identifier 31 judges that the catalyst is in its unheated state, and if the water temperature is higher than the set temperature, the temperature state identifier 31 judges that the catalyst is in its heated state. This temperature state judgment operation for determining catalyst light-off condition may be done by performing water temperature detection and a judgment on elapsed time from the point of engine startup at the same time, or by directly measuring the catalyst temperature.

The load condition detector 32 senses the load condition based on the engine speed determined by the accelerator opening detected by the acceleration sensor 24 and an input signal from the crank angle sensor 23, for instance.

The fuel injection controller 33 controls fuel injection timing and the amount of fuel to be injected from the injector 11 through an injector driving circuit 37. When the catalyst is in its unheated state, the fuel injection controller 33 performs quick light-off control operation in which fuel injection from the injector 11 is made at one time during each compression stroke in a specific low-load operating range of the engine, and as the engine load increases, the fuel injection controller 33 switches this one-time injection mode to an intake-compression stroke split injection mode which includes earlier injection performed during each successive intake stroke and later injection performed during each successive Compression stroke. Furthermore, in this embodiment, split injection is made during a compression stroke period corresponding to an engine operating range lying between the low-load operating range in which the fuel is injected at one time and a high-load operating range in which the fuel is separately injected in both the intake and compression strokes.

Figure 2A:
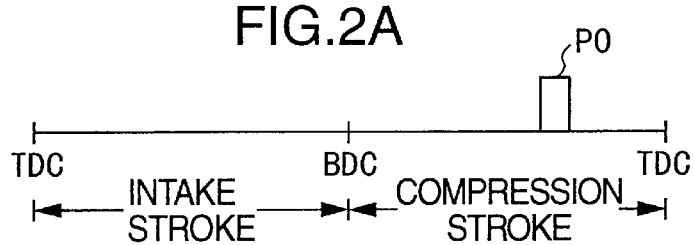
FIGS. 2A, 2B and 2C are time charts showing a one-time injection sequence performed in each compression stroke, a split injection sequence performed in each compression stroke, and a split injection sequence performed in successive intake and compression strokes, respectively.
Figure 2B:
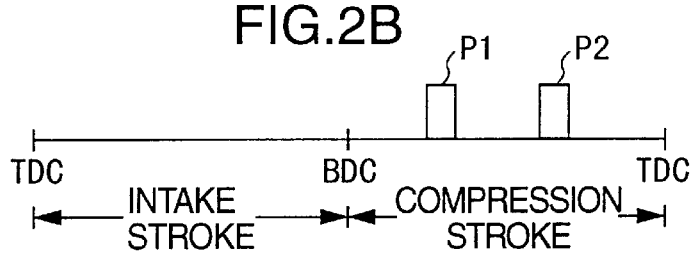
Figure 2C:
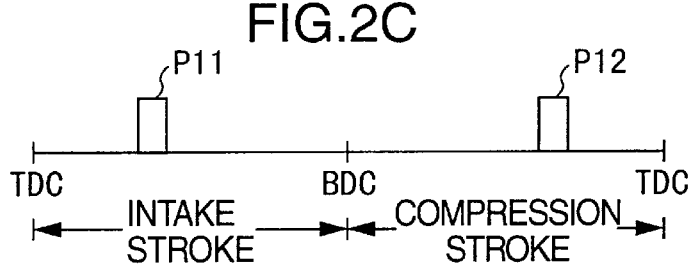
Figure 3:
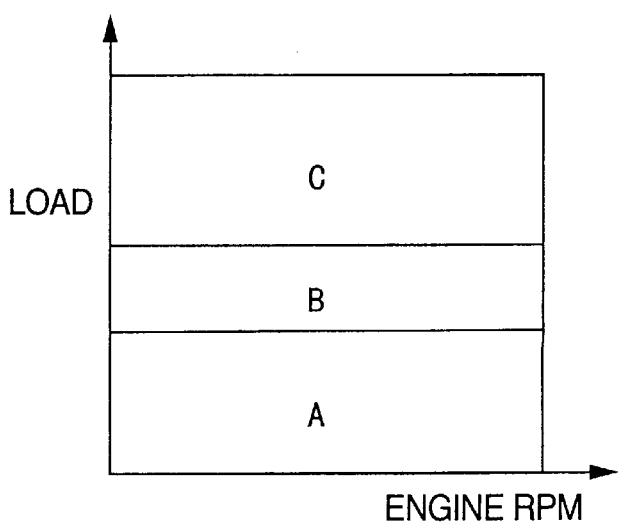
FIG. 3 is a diagram showing engine operating range settings for fuel injection control during a period when a catalyst is still in its unheated state.

Specifically, when the catalyst is in its unheated state, the mode of fuel injection from the injector 11 is altered as shown in FIGS. 2A–2C according to individual engine operating ranges shown in FIG. 3.

More specifically, one-time injection P0 is made in the latter half of the compression stroke as shown in FIG. 2A in a low-load range A (including no-load, or idling, conditions) below a first preset load value. Preferably, the injection timing is so controlled that it is advanced as the engine load increases within the low-load range A. In a medium-load range B which lies above the first preset load value but below a second preset load value, fuel injection from the injector 11 is made in two steps, that is, earlier injection P1 and later injection P2, during the period of the compression stroke. Although the proportions of fuel injected in the two injection cycles of this split injection mode are not specifically defined in this invention, it will be desirable if approximately the same amount of fuel (50% each) is injected by the earlier and later injections P1, P2.

In a high-load range C which lies above the second preset load value, a modified mode of split injection operation is performed, including earlier injection P11 made during the intake stroke and later injection P12 made during the compression stroke. Although the proportions of fuel injected in the two injection cycles of this split injection mode are not specifically defined either, it will be desirable if approximately the same amount of fuel (50% each) is injected by the earlier and later injections P11, P12.

In FIGS. 2A–2C, P0, P1, P2, P11 and P12 indicate injection command pulses which serve as control signals fed from the injector driving circuit 37. The injector 11 is caused to open its outlet during time periods corresponding to the durations of these injection command pulses and inject the fuel whose quantity is determined according to the duration of each pulse.

The injection amount calculator 34 calculates the amount of fuel to be injected so that the air-fuel ratio within the whole internal space of the combustion chamber 5 falls within a set range of 13 to 17 during a period when the catalyst is in its unheated state and the above-described quick light-off control operation is performed. This control operation may be performed in the form of open-loop control, in which the amount of fuel to be injected is calculated based on the amount of intake air and the engine speed, until the $O_2$ sensor 21 becomes active, and in the form of feedback control such as proportional-plus-integral (PI) control, in which a feedback correction value is calculated according to variations in the output of the $O_2$ sensor 21 after it has become active.

Although the air-fuel ratio can be controlled to match the stoichiometric air-fuel ratio by using the $O_2$ sensor 21 by ordinary feedback control, it is also possible to perform feedback control such that the air-fuel mixture is slightly leaner or richer than the stoichiometric ratio. This would be done by introducing a delay time in feedback correction value inverting action due to a change in varying direction of the output of the $O_2$ sensor 21 in such a way that the delay time is differentiated between lean and rich mixture settings, or by differentiating P value (proportional gain) or I value (integral gain) for the PI control, for example.

The ignition timing controller 35 outputs a control signal to the cylinder head 38 to thereby control the ignition timing according to engine operating conditions. Although the ignition timing controller 35 usually controls the ignition timing to achieve a minimum spark advance for best torque (MBT), it retards the ignition timing by a specified amount during the quick light-off control operation performed when the catalyst is in its unheated state.

The engine speed controller 36 controls the amount of intake air or the ignition point, for instance, in such a way that the idling engine speed becomes higher when the catalyst has been fully heated than the period when the catalyst is in its unheated state.

The ECU 30 is so constructed as to control the amount of intake air as well by outputting a control signal to the actuator 19 for actuating the throttle valve 18. More specifically, the ECU 30 controls the opening of the throttle valve 18 according to the accelerator opening when the engine is operated at the stoichiometric air-fuel ratio in the high-load range when the catalyst is in its unheated state or has been heated, whereas the ECU 30 controls the throttle valve 18 to open to increase the amount of intake air and thereby increase air-fuel ratio for producing a leaner mixture when stratified charge combustion is made by injecting the fuel solely in the compression stroke in low-load range operation after warm-up, for example. Further, the ECU 30 controls the swirl control valve 17 in order that a swirl is produced within the combustion chamber 5 when one-time injection during the compression stroke or split injection is made while the catalyst is still in its unheated state.

Figure 4:
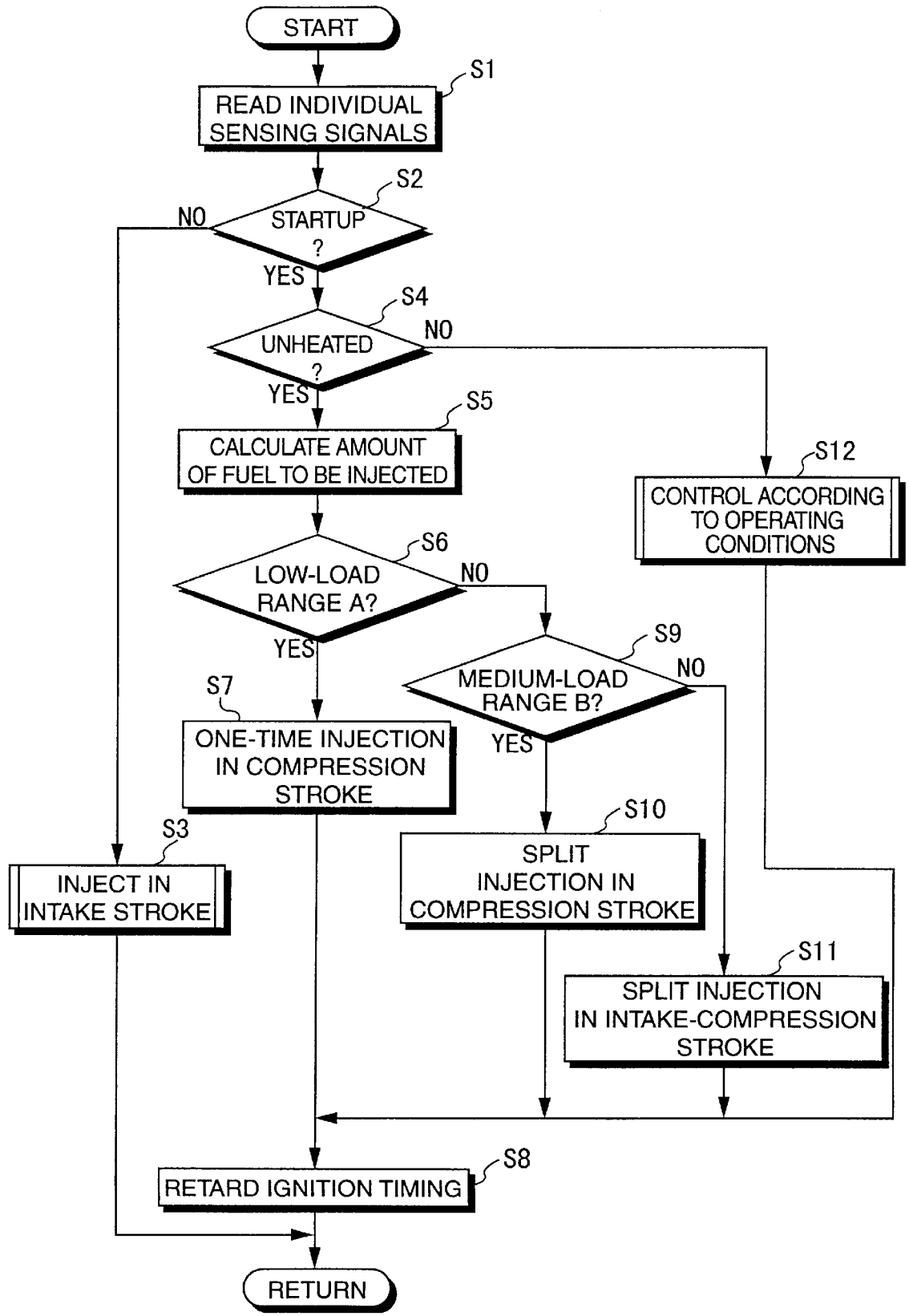
FIG. 4 is a flowchart showing an example of control operation of the direct injection engine.

An example of control operation of this direct injection engine is now described referring to FIG. 4.

When a routine shown in FIG. 4 is commenced, various sensing signals are entered in step S1 and a judgment is made in step S2 to determine whether the engine is in its startup stage. If the engine is in the startup stage, the fuel is injected during the intake stroke such that its evaporation and atomization are well promoted and proper torque is produced in a desirable fashion, and the ignition timing is adjusted to achieve an MBT point.

If the engine is not in the startup stage, a judgment is made in step S4 to determine whether the catalyst is still in its unheated state by examining the water temperature, elapsed time from engine startup, etc. If the catalyst is still in the unheated state, the amount of fuel to be injected which will produce an air-fuel ratio between 13 and 17 is calculated in step S5 and a further judgment is made in step S6 to determine whether the engine load is in the low-load range A. If the engine load falls within the low-load range A, the injector 11 is controlled in step S7 to perform a one-time injection sequence during the compression stroke. In one preferred mode of injection control, the injection timing in the one-time injection sequence is so controlled that it is advanced as the engine load increases within the low-load range A in step S7. Subsequently, the ignition timing is retarded in step S8.

If it is judged that the engine load does not fall within the low-load range A in step S6, a further judgment is made in step S9 to determine whether the engine load is in the medium-load range B. If the engine load falls within the medium-load range B, the injector 11 is controlled in step S10 to perform a split injection sequence during the compression stroke and, then, the ignition timing is retarded (step S8).

If it is judged that the engine load does not fall within the low-load range A or medium-load range B through the steps S6 and S9, that is, the engine load is in the high-load range C, the injector 11 is controlled in step S11 to perform a split injection sequence in successive intake and compression strokes and, then, the ignition timing is retarded (step S8).

After the catalyst has been heated, fuel injection is controlled according to the engine operating conditions. For example, if the engine is in a low-speed, low-load range, compression stroke injection is selected to perform stratified charge combustion and the air-fuel ratio is increased to produce a leaner mixture. On the other hand, if the engine is in a high-speed operating range or high-load range, intake stroke injection is selected to perform uniform combustion. Further, in a range between the stratified charge combustion range and uniform combustion range lying within the medium-load range, there are cases where split injection is made in the successive intake and compression strokes to prevent sudden changes in output torque.

Operational features and advantages of the above-described direct injection engine of the present invention are now described.

If the catalyst is in its unheated state upon engine startup, one-time injection is made in the compression stroke in the low-load range A including the idling range. As a consequence, HC and NOx emissions are reduced under low-load conditions and the exhaust gas temperature increases so that quick light-off of the catalyst is promoted and deterioration in fuel economy is reduced to a relatively low level. Experimental results representing such advantageous effects are shown in FIGS. 5A–5C.

Figure 5A:
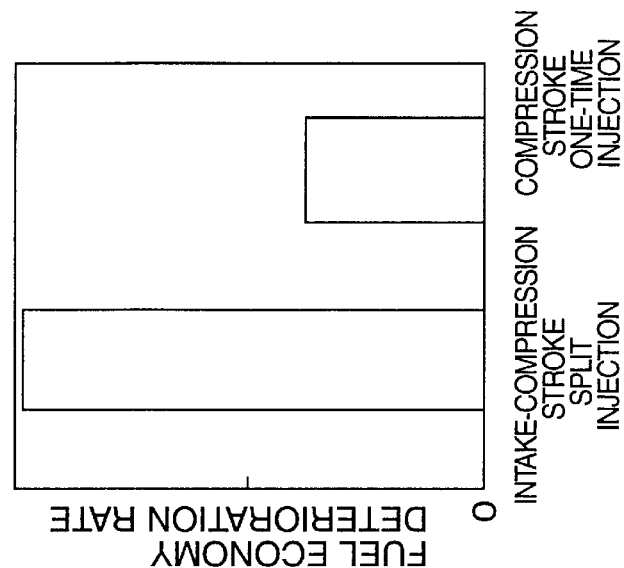
FIGS. 5A, 5B and 5C are graphs representing respectively the amounts of NOx emissions, the amounts of HC emissions and fuel economy deterioration rates in both compression stroke one-time injection and intake-compression stroke split injection.
Figure 5B:
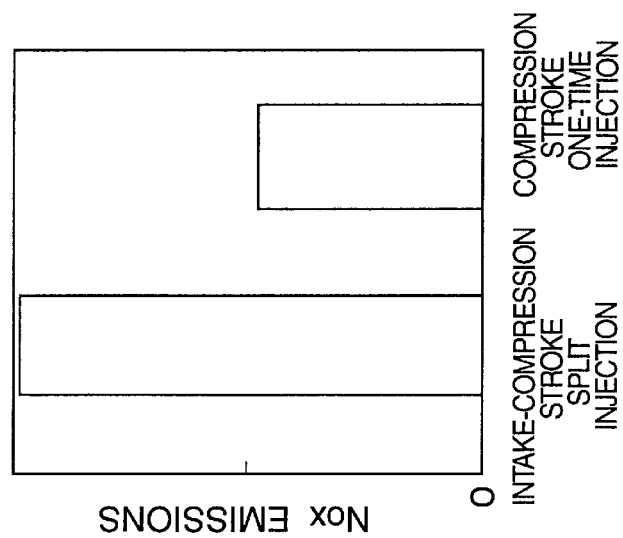
Figure 5C:
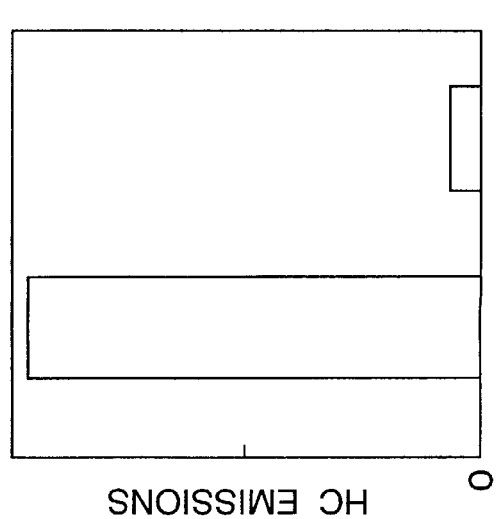

FIGS. 5A–5C show the experimental results in graphical form including measurements of the amounts of HC and NOx emissions from the combustion chamber. Experiments were conducted by performing an intake-compression stroke split injection sequence (in which earlier injection was made in the intake stroke and later injection was made in the compression stroke) as well as a one-time injection sequence in the compression stroke under the following operating conditions:

| | |
|---|---|
| Temperature of engine cooling water: | 40° C. |
| Catalyst state: | Unheated |
| Engine speed: | 1500 rpm |
| Brake mean effective pressure (Pe): | 0 kPa |
| Air-fuel ratio in whole internal space of combustion chamber: | Stoichiometric ratio ($\lambda = 1$) |

Fuel economy deterioration rates shown in FIG. 5A are based on a comparison with fuel economy values obtained by one-time injection made in the intake stroke.

As is apparent from the graphical representation of FIGS. 5A–5C, the amounts of HC and NOx emissions by compression stroke one-time injection are dramatically smaller than the amounts of HC and NOx emissions by compression stroke one-time injection by intake-compression stroke split injection in the low-load range A including the idling range. In addition, the deterioration in fuel economy is kept to a relatively low level in compression stroke one-time injection. Although advantageous effects concerning exhaust gas temperature increase are not shown in the graphical representation, the HC emission reducing effect and exhaust gas temperature increasing effect are mostly interrelated with each other. Thus, the exhaust gas temperature remarkably increases in the compression stroke one-time injection sequence than in the intake-compression stroke split injection sequence and quick light-off operation is promoted.

Although HC and NOx reduction and quick light-off effects are enhanced by performing the compression stroke one-time injection in the low-load range as described above, the HC and NOx reduction effects would diminish (causing an increase in HC and NOx emissions) when the engine load increases, as will be later discussed with reference to the graphs shown in FIG. 14.

Figure 6:
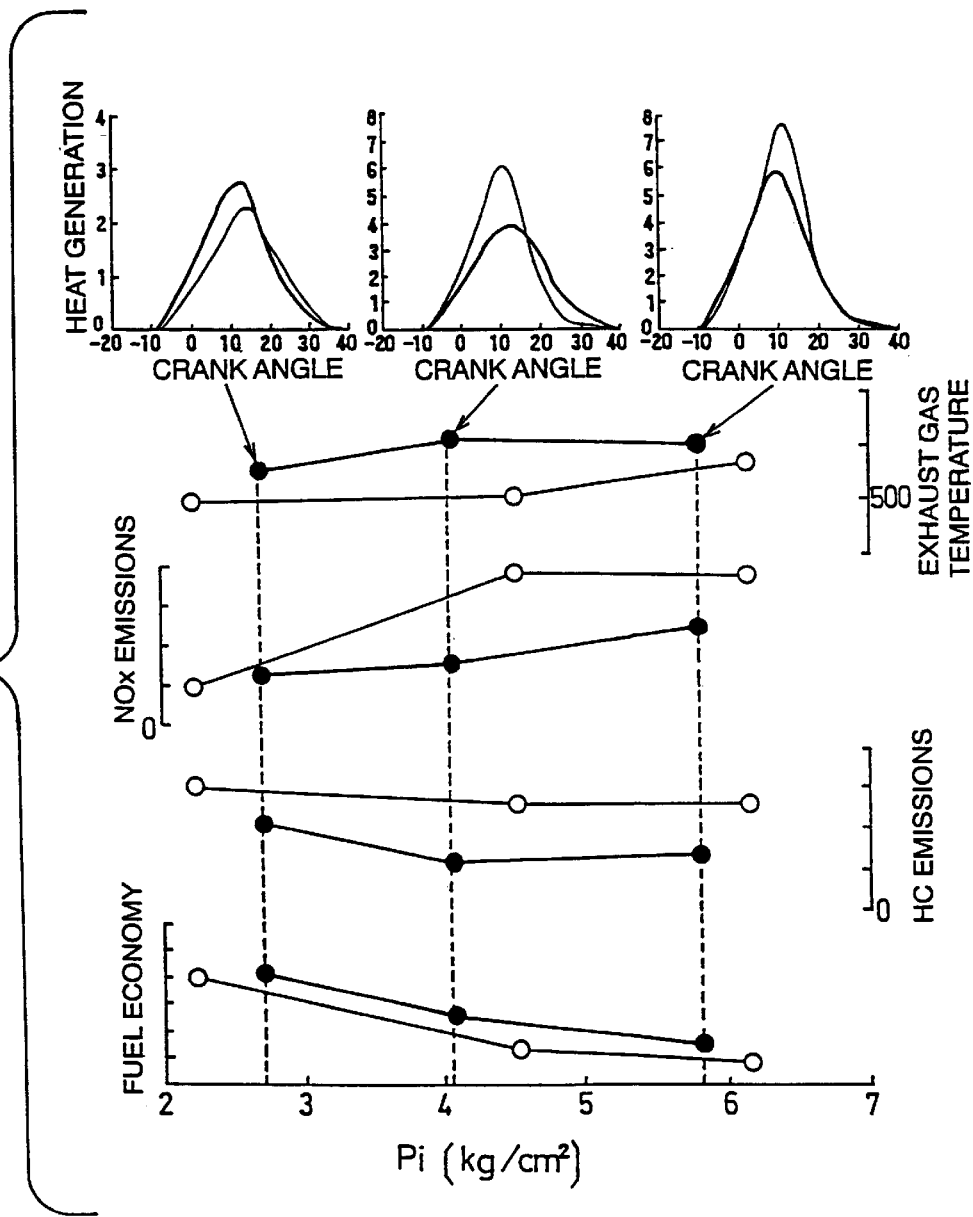
FIG. 6 shows graphs representing heat release patterns, exhaust gas temperatures, the amounts of NOx emissions, the amounts of HC emissions and fuel economy measurements in both intake-compression stroke split injection and compression stroke one-time injection under various load conditions.

FIG. 6 shows exhaust gas temperatures, the amounts of NOx emissions, the amounts of HC emissions and fuel economy measurements obtained when the indicated mean effective pressure (Pi) is varied in various ways and the injector 11 is controlled to make both intake-compression stroke split injection and intake stroke one-time injection at an engine speed of 1500 rpm with the air-fuel ratio in the whole internal space of the combustion chamber 5 set to the stoichiometric air-fuel ratio ($\lambda$=1) in graphical form, as well as heat release patterns obtained in the low-load, medium-load and high-load ranges. In FIG. 6, all data taken by intake-compression stroke split injection are shown by small solid black circles while all data taken by intake stroke one-time injection are shown by small open circles. In each graph showing the heat release patterns, the horizontal axis represents crank angle while the vertical axis represents the amount of heat release, in which a thick line shows data taken by intake-compression stroke split injection while a thin line shows data taken by intake stroke one-time injection.

As can been seen from the graphs of FIG. 6, the HC and NOx reduction and exhaust gas temperature increasing effects are small in a low-load range, in which the indicated effective pressure (Pi) is smaller than about 2.5 kg/cm$^2$ (245 kPa), in intake-compression stroke split injection compared to intake stroke one-time injection, whereas the HC and NOx reduction and exhaust gas temperature increasing effects are increased in a load range at about 4 kg/cm$^2$ (392 kPa). A heat release pattern obtained by intake-compression stroke split injection in the latter load range (at about 4 kg/cm$^2$) is a pattern which provides suppressed initial combustion and accelerated afterburning in a favorable fashion, as will be described later in great detail referring to FIG. 8.

The HC and NOx reduction and exhaust gas temperature increasing effects are obtained to a certain degree in load ranges higher than the load range.

It is understood from the data shown in FIGS. 5A–5C, 6, etc. that HC and NOx reduction and exhaust gas temperature increasing effects are obtained in respective load ranges if the above-described compression stroke one-time injection sequence is used in a low-load range including the idling range and the above-described intake-compression stroke split injection sequence is used in a high-load range. In addition, the earlier-mentioned compression stroke split injection sequence is preferably used as a transitional form of injection in a range between the low-load range, in which the compression stroke one-time injection sequence is performed, and the high-load range, in which the intake-compression stroke split injection sequence is performed.

Reasons why the effects are achieved are now described.

Figure 7A:
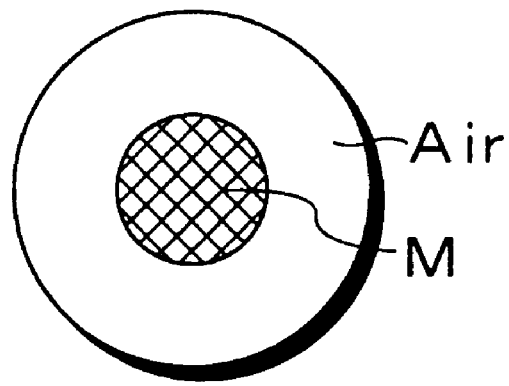
FIGS. 7A, 7B and 7C are diagrams schematically showing the distribution of a mixture within a combustion chamber in compression stroke one-time injection, compression stroke split injection and intake-compression stroke split injection, respectively.

The following discussion deals with how an air-fuel mixture produced by the fuel injected from the injector 11 is distributed within the combustion chamber 5. Generally speaking, the shorter the time period from fuel injection to ignition, the more insufficient the evaporation and atomization of the fuel, and the more likely is the injected fuel to gather around the spark plug 10. Accordingly, in the case of compression stroke one-time injection, a mass of mixture M produced by the injected fuel is locally distributed around the spark plug 10 and there is created an air layer which serves as a quenching layer almost entirely lacking fuel content around the mixture mass M as shown in FIG. 7A. The mixture mass M itself has its own internal structure, which includes a relatively rich inner region and a relatively lean outer region.

Figure 7B:
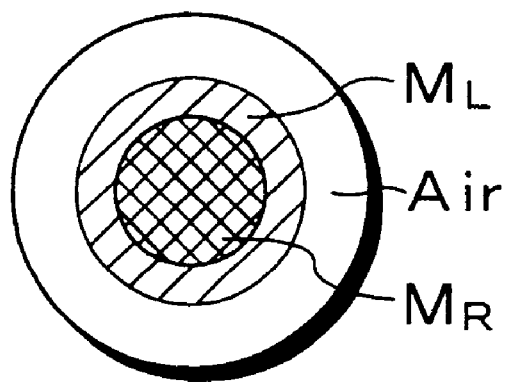

In the case of compression stroke split injection, a relatively rich mixture layer MR produced by the later injection P2 is locally distributed around the spark plug 10 and a relatively lean mixture layer ML produced by the earlier injection P1 is formed all around the mixture layer MR as shown in FIG. 7B. Since both the earlier injection P1 and later injection P2 are made in each compression stroke in this case, the mixture M is not thoroughly distributed throughout the whole internal space of the combustion chamber 5 and there is created an air layer which serves as a quenching layer at an outer peripheral part of the combustion chamber 5.

Figure 7C:
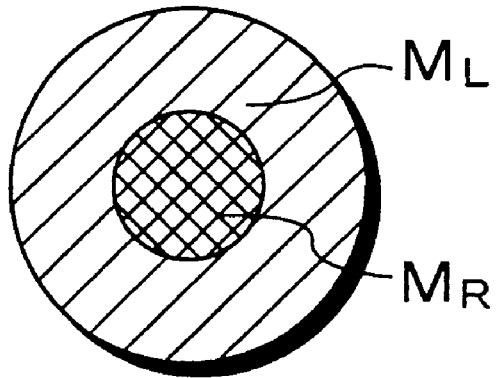

In the case of intake-compression stroke split injection, a relatively rich mixture layer MR produced by the later injection P12 is locally distributed around the spark plug 10 and a relatively lean mixture layer ML produced by the earlier injection P11 during the intake stroke is formed all around the mixture layer MR, with this outer mixture layer MR distributed throughout the whole internal space of the combustion chamber 5, as shown in FIG. 7C.

Factors favorably governing the reduction of the HC and NOx emissions and increase in exhaust gas temperature are now considered. As it is effective for the reduction of the HC and NOx emissions to lower the rate of combustion and suppress the maximum amount of heat release, a factor influential in reducing the NOx emissions is to suppress initial combustion by enriching the mixture at a central part of the combustion chamber 5 (just around the spark plug 10) to achieve an air-fuel ratio considerably higher than the stoichiometric air-fuel ratio and by degrading evaporation and atomization of the injected fuel. Other factors influential in reducing the NOx emissions are to lower the rate of combustion by making the mixture at the outer peripheral part of the combustion chamber 5 leaner and to increase ignition-point retarding capability.

Factors influential in reducing the HC emissions and increasing the exhaust gas temperature are acceleration of combustion in a latter portion of the entire combustion period (hereinafter referred to as afterburning) by degrading evaporation and atomization of the injected fuel for ensuring sufficient combustion of the mixture till the end of the combustion period, existence of an air layer serving as a quenching layer in the outer peripheral part of the combustion chamber 5 to prevent the fuel from entering into a gap between cylinder walls and pistons and exhausted without burning, for instance.

Figure 8:
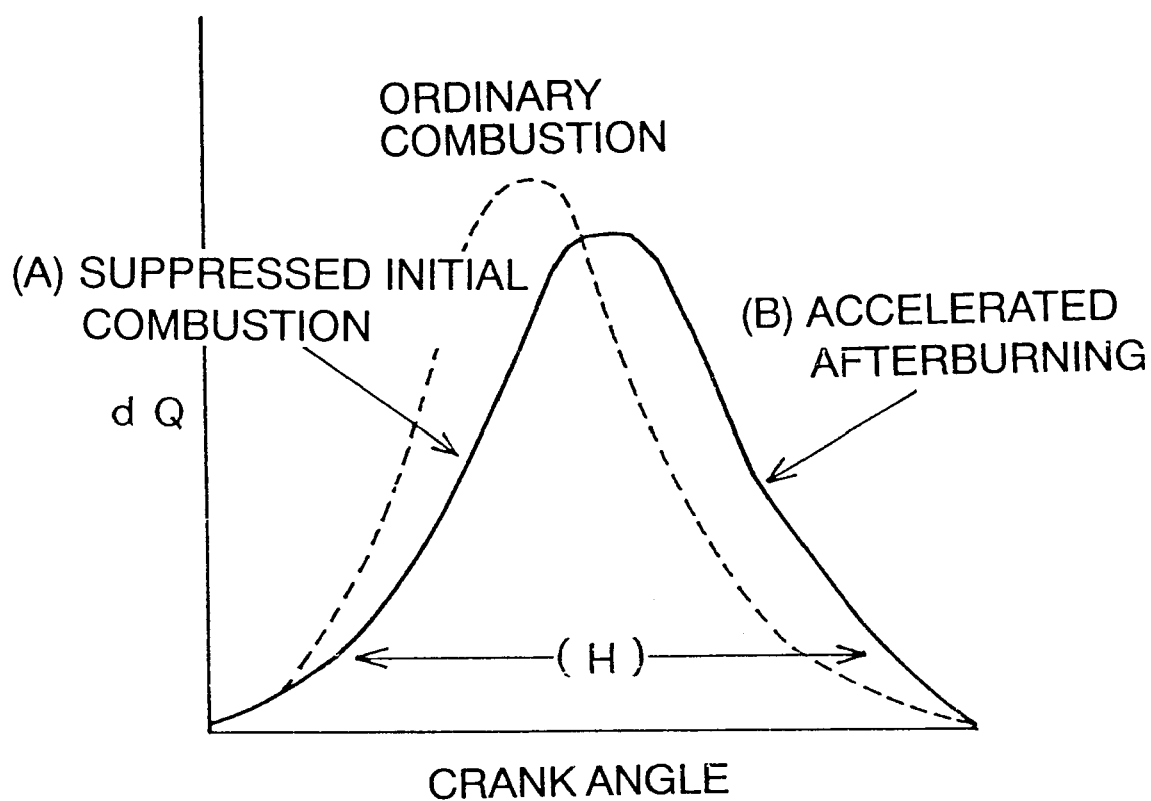
FIG. 8 is an explanatory diagram showing heat release patterns.

Under these circumstances, it is advantageous for the reduction in HC and NOx emissions and quick light-off that initial combustion be suppressed such that the heat release pattern after ignition (or a change in the amount of heat release dQ per unit crank angle) gently rises as shown by a slid line in FIG. 8 compared to the pattern of ordinary combustion shown by a broken line in FIG. 8, and that combustion in the latter portion of the entire combustion period (afterburning) be accelerated.

Figure 9:
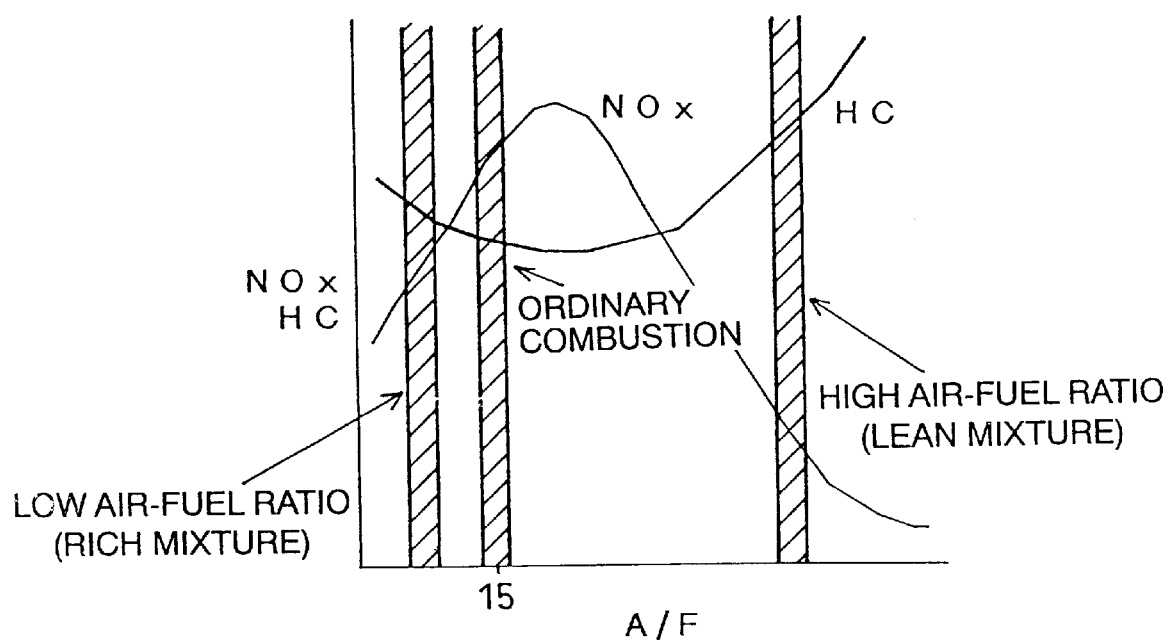
FIG. 9 is a diagram showing the relationship between the air-fuel ratio and the amounts of HC and NOx emissions.

Shown in FIG. 9 is the relationship between the air-fuel ratio and the amounts of HC and NOx emissions. Since the amount of NOx emissions increases in a range of ordinary air-fuel ratios that lies close to the stoichiometric air-fuel ratio, it is desirable for the reduction of the NOx emissions to avoid combustion in this range and cause the combustion to occur in a lower air-fuel ratio range (rich mixture) or higher air-fuel ratio range (lean mixture) shown in FIG. 9.

Figure 10:
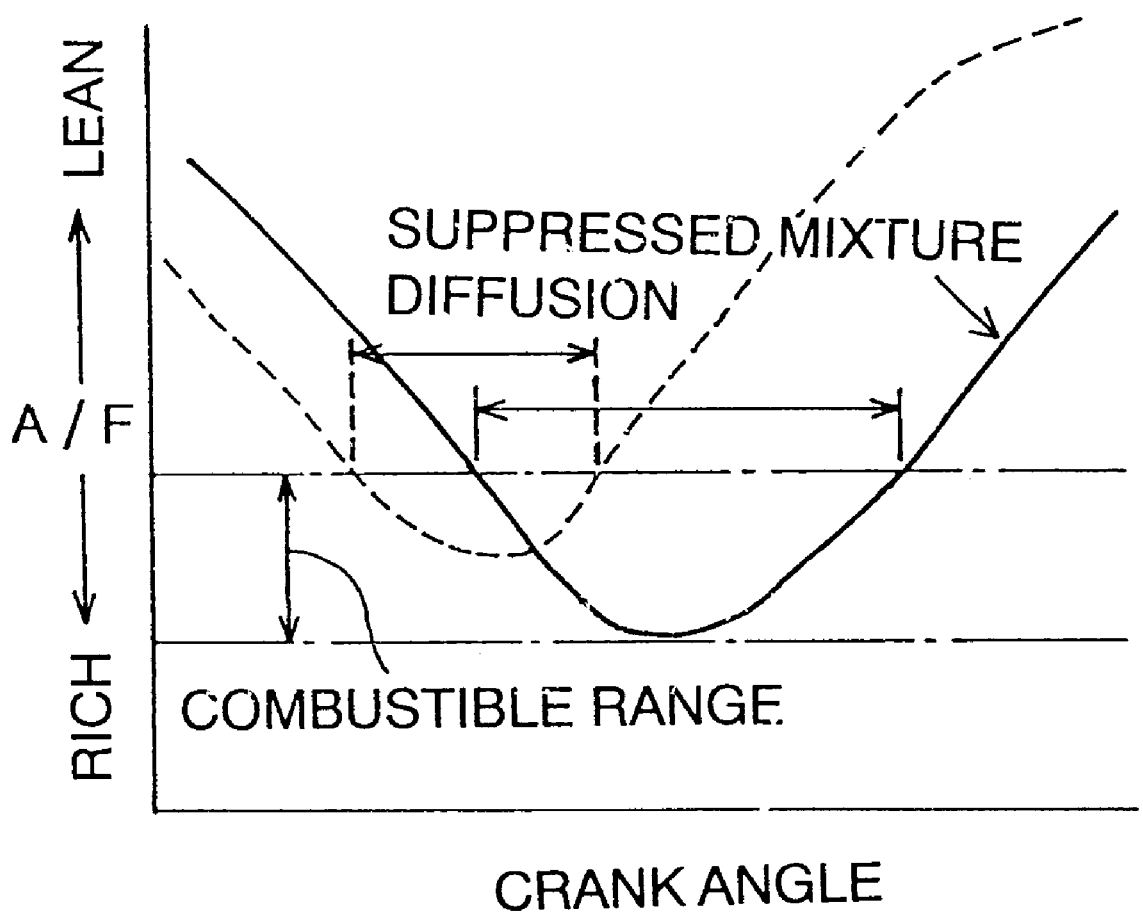
FIG. 10 is an explanatory diagram showing how the air-fuel ratio of a mass of mixture varies immediately around a spark plug.

FIG. 10 illustrates how the air-fuel ratio immediately around the spark plug 10 varies after fuel injection in the case of compression stroke one-time injection with the horizontal axis representing the crank angle. In FIG. 10, a broken line shows a case in which the injection timing is set to a point of optimum fuel economy, and a solid line shows a case in which dispersion of the mixture is suppressed by retarding the injection timing. Further, a combustible range shown in FIG. 10 is a range in which the mixture is capable of burning upon ignition. It is essential that the mixture be ignited during a period when the air-fuel ratio near the spark plug 10 falls within the combustible range. As shown in this Figure, the period in which the air-fuel ratio near the spark plug 10 lies in the combustible range is retarded and lengthened when the dispersion of the mixture is suppressed by retarding the injection timing, compared to the case where the injection timing is set for optimum fuel economy. Therefore, it is possible to increase the amount of ignition-timing retardation, or to increase ignition-timing retarding capability.

Next, engine behavior in a case where the compression stroke one-time injection sequence is performed in the low-load range A including the idling range is discussed based on the data. In this case, the mixture is locally distributed in a specified area around the spark plug 10 as shown in FIG. 7A, because the time period from fuel injection to ignition is short. Within this specified area, a stratified charge state in which the mixture is relatively rich is created in the inner region close to the spark plug 10, and fuel droplets caused by insufficient evaporation and atomization of the injected fuel are contained in a region where the mixture is locally distributed. As combustion process is performed in such conditions of mixture distribution, the heat release pattern shown by the solid line in FIG. 8, or a combustion state in which initial combustion is suppressed and afterburning is accelerated, is obtained. Furthermore, an air layer effective for HC suppression is created in the outer peripheral part of the combustion chamber 5. Thus, the HC and NOx reduction and exhaust gas temperature increasing effects are obtained.

Figure 11:
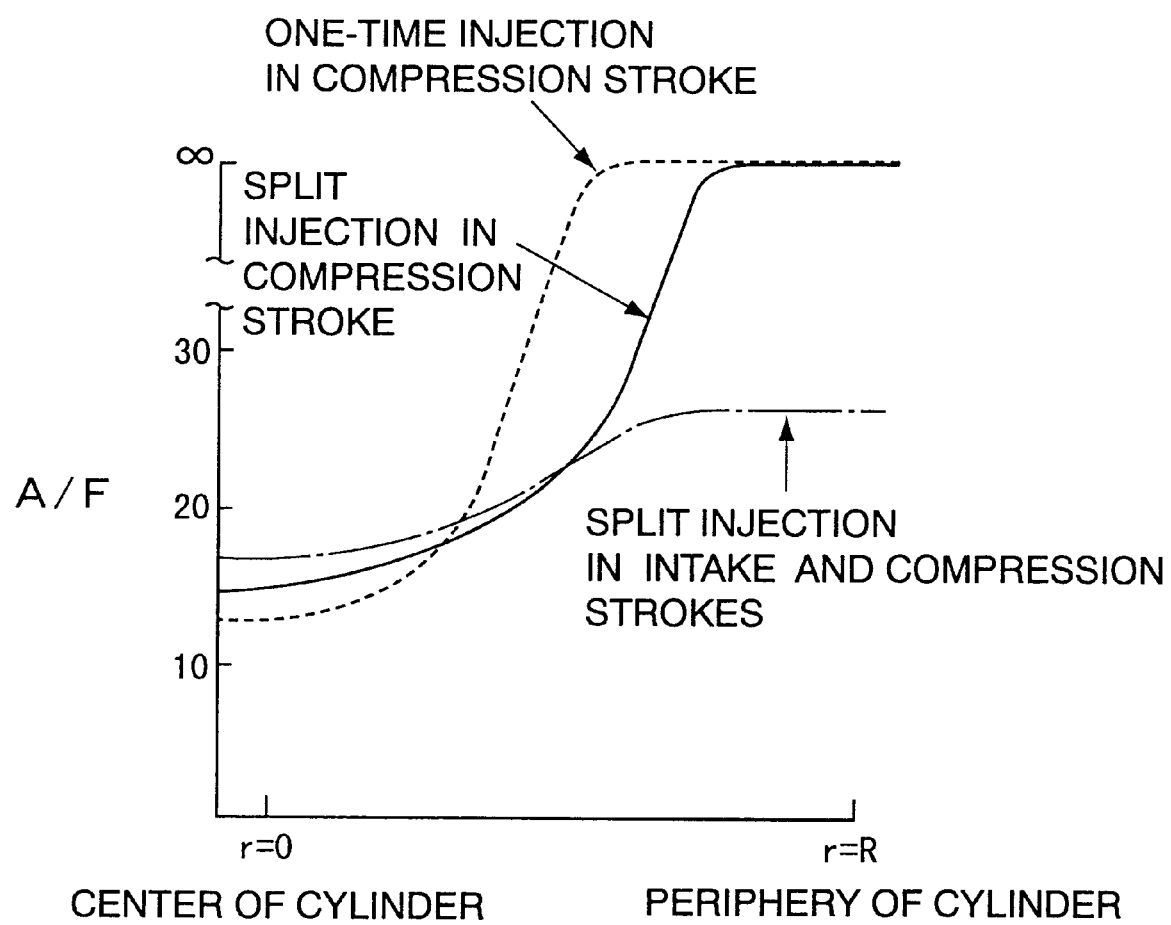
FIG. 11 is a graph showing air-fuel ratios at different points within the combustion chamber achieved when engine load is low.

Shown in FIG. 11 a distribution of the air-fuel ratio achieved at different points in the combustion chamber 5 under low-load conditions, in which the horizontal axis represents the distance from the cylinder center (i.e., the center of the combustion chamber 5). More particularly, FIG. 11 shows the distribution of the air-fuel ratio achieved at the different points in the combustion chamber 5 under low-load conditions for compression stroke one-time injection (broken line), compression stroke split injection (solid line) and intake-compression stroke split injection (alternate long and short dashed line). As shown in this Figure, the mixture mass becomes reasonably rich at the central part of the combustion chamber 5 and is confined within a properly compact space suited for the amount of injected fuel under low-load conditions where the amount of injected fuel is small. Since the mixture is held in a properly rich state, which corresponds to the lower air-fuel ratio range (rich mixture) of FIG. 9, up to a certain distance from the cylinder center and becomes suddenly leaner from that distance, the region where the air-fuel ratio falls in a range which is likely to cause NOx emissions is made extremely small.

The above discussion also indicates that the compression stroke one-time injection sequence performed under low-load conditions is advantageous for the reduction of the HC and NOx emissions.

Furthermore, because dispersion of the mixture is suppressed by the compression stroke one-time injection sequence, it is possible to increase the amount of ignition-point retardation as is apparent from FIG. 10. In addition, the HC and NOx reduction and exhaust gas temperature increasing effects are further increased.

Figure 12:
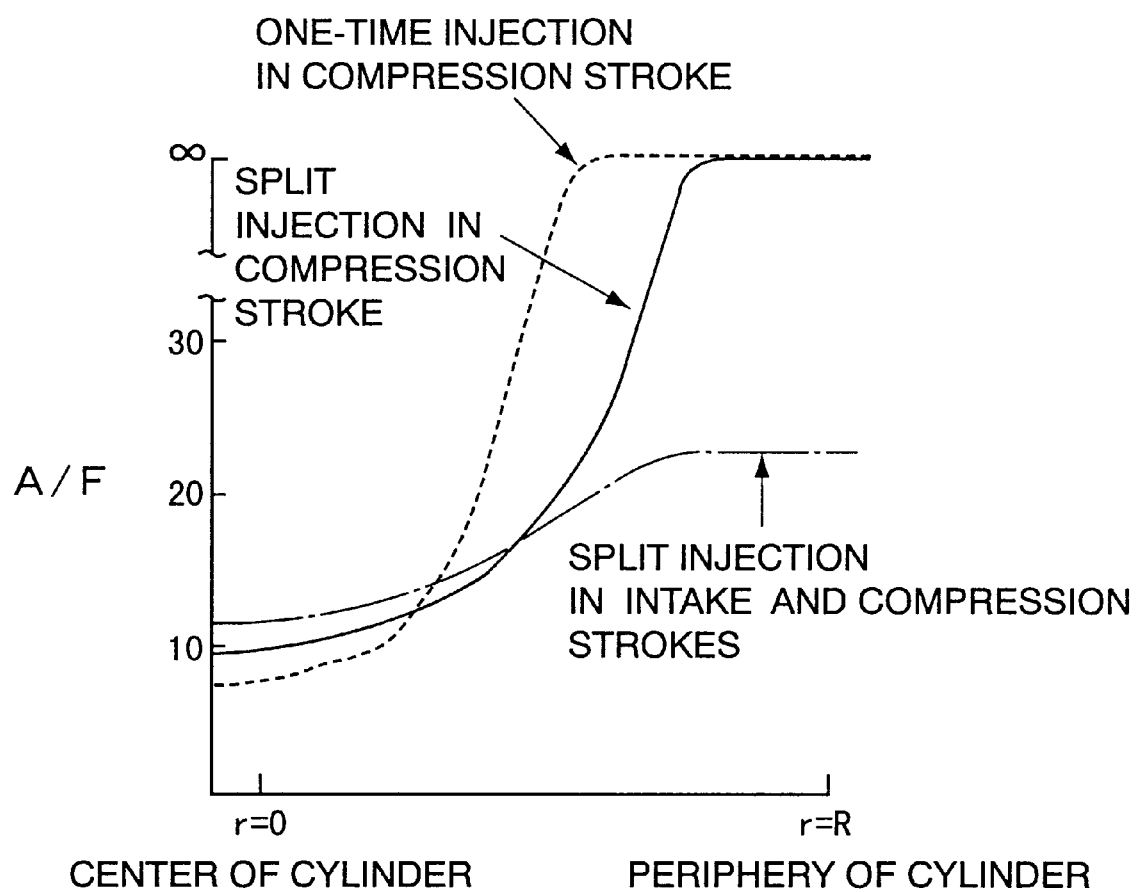
FIG. 12 is a graph showing air-fuel ratios at different points within the combustion chamber achieved when engine load is relatively high.

Like FIG. 11, FIG. 12 shows a distribution of the air-fuel ratio achieved at different points in the combustion chamber 5 in the cases of compression stroke one-time injection (broken line), compression stroke split injection (solid line) and intake-compression stroke split injection (alternate long and short dashed line). FIG. 12, however, shows the air-fuel ratio achieved in a higher-load engine operating range (medium-load range) than FIG. 11. As shown in this Figure, when the engine load increases, a mixture rich enough for the amount of injected fuel tends to be excessively concentrated in the central part of the combustion chamber 5 in compression stroke one-time injection, making the air-fuel ratio of the mixture immediately around the spark plug 10 too high (over-rich mixture). In other words, when the engine load increases, there arises a tendency for the mixture concentration to rise due to an increase in the amount of injected fuel, and when the internal pressure of the combustion chamber 5 increases as a result of an engine load increase, there arises a tendency for the spray angle of the injected fuel to decrease consequently. These tendencies makes a rich mixture mass likely to be excessively concentrated in the central part of the combustion chamber 5.

For the reasons, it is assumed that the injected fuel does not completely burn in the central part of the combustion chamber 5, possibly causing the HC emissions, and the NOx emissions are likely to be produced in regions at a certain distance from the cylinder center where the air-fuel ratio gradually increases (leaner mixture).

On the contrary, if there is made an arrangement to switch to compression stroke split injection as a result of an engine load increase, a proper stratified charge state (in which the mixture is properly dispersed) is created, making it possible to prevent the rich mixture mass from being excessively concentrated in the central part of the combustion chamber 5 and, as a consequence, a properly rich state is achieved in the central part of the combustion chamber 5. In the high-load range where the amount of injected fuel further increases, it is possible to achieve a proper stratified charge state by using the intake-compression stroke split injection sequence. More specifically, as the mode of fuel injection is switched from compression stroke one-time injection to compression stroke split injection, and then to intake-compression stroke split injection with increasing engine load, the concentration of the mixture at the outer peripheral part of the combustion chamber 5 varies to the "rich" side within a range in which the air-fuel ratio is higher (leaner mixture) than the stoichiometric air-fuel ratio, and the concentration of the mixture around the spark plug 10 varies to the "lean" side within a range in which the air-fuel ratio is lower (richer mixture) than the stoichiometric air-fuel ratio at individual switching points, so that the mixture distribution is properly adjusted.

Figure 13:
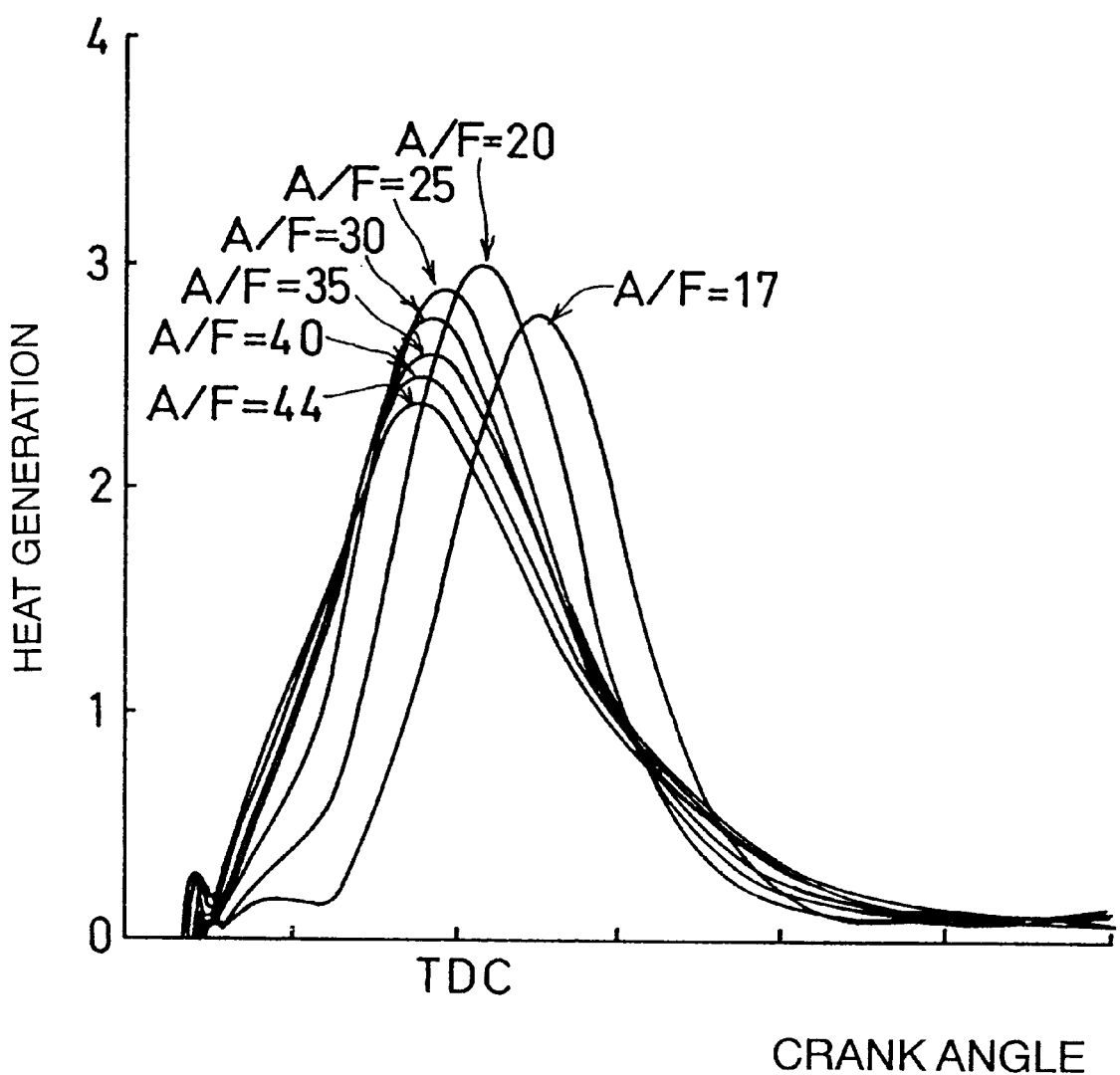
FIG. 13 is a diagram showing heat release patterns obtained at various air-fuel ratios in compression stroke one-time injection.

FIG. 13 shows heat release patterns obtained when the mixture is burnt in the stratified charge state at an engine speed of 1500 rpm in compression stroke one-time injection while varying the mean air-fuel ratio with the indicated mean effective pressure (Pi) set to 2 $kg/cm^2$ (196 kPa).

Figure 14:
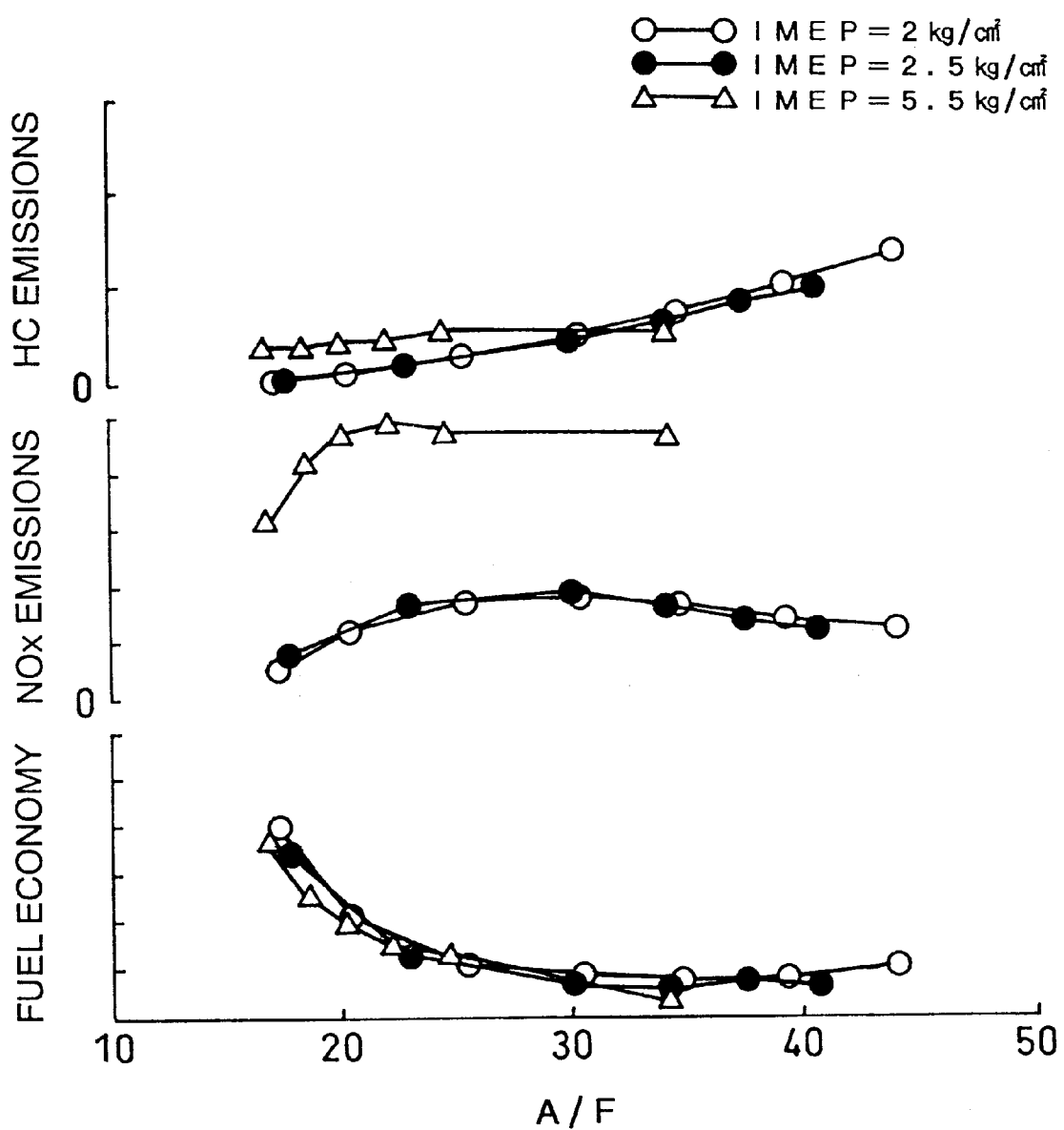
FIG. 14 gives a graphical representation of the amounts of HC and NOx emissions produced by compression stroke one-time injection under various load and air-fuel ratio conditions.

FIG. 14 shows HC emissions, NOx emissions and fuel economy measurement results obtained when the indicated mean effective pressure (Pi) is set to 2 $kg/cm^2$ (196 kPa), 2.5 $kg/cm^2$ (245 kPa) and 5.5 $kg/cm^2$ (539 kPa) at an engine speed of 1500 rpm in compression stroke one-time injection while varying the mean air-fuel ratio in various ways.

As can be seen from FIGS. 13 and 14, initial combustion is highly accelerated when the mean air-fuel ratio becomes 20 or above and the amounts of HC and NOx emissions show a tendency to increase in the compression stroke one-time injection sequence, whereas when the air-fuel ratio in the whole internal space of the combustion chamber 5 decreases to about 17, initial combustion suppression and afterburning acceleration effects are obtained in the compression stroke split injection sequence and, as a consequence, the amounts of HC and NOx emissions decrease.

To summarize the above discussion, it is possible to obtain the desirable HC and NOx reduction effects and quick light-off effects due to the increase in exhaust gas temperature by performing the split injection sequence with the mean air-fuel ratio set to 13 to 17 in the low-load range A. When the engine load increases up to the medium-load range B, the mode of fuel injection is switched to compression stroke split injection. When the engine load further increases up to the high-load range C, the mode of fuel injection is switched to intake-compression stroke split injection, whereby it becomes possible to prevent the air-fuel ratio immediately around the spark plug 10 from becoming too high (over-rich mixture) due to excessive concentration of a rich mixture in the central part of the combustion chamber 5 and to produce the proper stratified charge state even in the medium- to high-load ranges to thereby obtain the HC and NOx reduction effects and quick light-off effects due to the increase in exhaust gas temperature.

Furthermore, it is possible to increase the amount of ignition-point retardation due to the proper stratified charge state and, as a consequence, the HC and NOx reduction and exhaust gas temperature increasing effects can be enhanced.

If the injection timing is advanced in the compression stroke one-time injection sequence in the low-load range A in accordance with engine load increase, the distribution of the mixture is properly adjusted. This means that it is possible to prevent the mixture from being excessively concentrated in the central part of the combustion chamber 5 by advancing the injection timing in accordance with an increase in the amount of injected fuel even in the one-time injection sequence, as long as the amount of injected fuel does not exceed a specified value.

In summary, an inventive control device is used for a direct injection engine having a catalyst provided in an exhaust passage for converting exhaust gases and an injector for injecting fuel directly into a combustion chamber. The control device comprises a temperature state identifier for judging the temperature state of the catalyst, a load condition detector for sensing engine load conditions, and a fuel injection controller for controlling fuel injection from the injector. The fuel injection controller performs quick light-off control operation by causing the injector to inject fuel in one-time injection mode during a compression stroke in a specific low-load operating range of the engine when the catalyst is in its unheated state where its temperature is below its activation temperature, and switching the mode of fuel injection to intake-compression stroke split injection mode which includes earlier injection made during an intake stroke and later injection made during the compression stroke in a specific high-load operating range of the engine, based on judgment results of the temperature state identifier and sensing results of the load condition detector.

In this direct injection engine control device, the fuel is injected at one time during the compression stroke in the specific low-load operating range of the engine when the catalyst is not fully heated yet. In this one-time injection mode, a mixture containing fuel droplets caused by insufficient evaporation and atomization is unevenly distributed within the combustion chamber because the time period from injection to ignition is so short. This serves to suppress initial combustion and accelerate combustion in a latter portion of an entire combustion period (or afterburning), eventually producing such advantageous effects as a reduction in HC and NOx emissions and promotion of catalyst quick light-off operation due to increased exhaust gas temperature. When the amount of injected fuel increases as a result of an increase in engine load, the mode of fuel injection is switched to the intake-compression stroke split injection mode so that the mixture is properly dispersed. This split injection mode performed in the specific high-load operating range provides HC and NOx reduction and quick light-off effects.

Also, it is preferable for the direct injection engine control device that the fuel injection controller control the injector to make split injection during the compression stroke in an engine operating range lying between the low-load operating range, in which fuel injection from the injector is made at one time during the compression stroke, and the high-load operating range, in which intake-compression stroke split injection is made, during the quick light-off control operation.

With this arrangement, the mode of fuel injection is sequentially switched from compression stroke one-time injection to compression stroke split injection, and then to intake-compression stroke split injection with increasing engine load and a resultant increase in the amount of injected fuel. As a consequence, the state of mixture distribution is adjusted such that desirable HC and NOx reduction and quick light-off effects are obtained in the individual engine load ranges.

It is also preferable that fuel injection during the quick light-off control operation be made with the mean air-fuel ratio set within a range of 13 to 17 in the individual injection modes including the one-time injection mode in the compression stroke and the intake-compression stroke split injection mode.

The reason why the air-fuel ratio should be set within the range is that this range provides high heat release efficiency and, thus, the capability of increasing the exhaust gas temperature.

Further, it is preferable that fuel injection during the quick light-off control operation be made in the individual injection modes including the one-time injection mode in the compression stroke and the intake-compression stroke split injection mode in such a way that the air-fuel ratio of a mixture within the combustion chamber becomes equal to or smaller than the stoichiometric air-fuel ratio in an inner region around a spark plug and becomes larger than the stoichiometric air-fuel ratio in an outer region around the inner region.

With this arrangement, it is possible to create a stratified charge state in which the desirable initial combustion suppression and afterburning acceleration effects are achieved. Since the mode of fuel injection is switched according to the engine load, the stratified charge state is properly adjusted in such a way that the advantageous effects are satisfactorily obtained.

Furthermore, it is preferable that the switching of the mode of fuel injection in accordance with an increase in engine load during the quick light-off control operation vary the concentration of the mixture in an outer peripheral part of the combustion chamber in such a way that the mixture becomes richer within a range in which the air-fuel ratio of the mixture is higher than the stoichiometric air-fuel ratio.

This arrangement serves to properly disperse the mixture and thereby prevent it from being excessively concentrated immediately around the spark plug when the amount of injected fuel increases.

Moreover, it is preferable that the switching of the mode of fuel injection in accordance with an increase in engine load during the quick light-off control operation vary the concentration of the mixture in the inner region around the spark plug in such a way that the mixture becomes leaner within a range in which the air-fuel ratio of the mixture is equal to or lower than the stoichiometric air-fuel ratio.

This arrangement serves to prevent the mixture around the spark plug from becoming over-rich when the amount of injected fuel increases.

It is preferable that one-time injection made in the specific operating range during the compression stroke in the quick light-off control operation be so controlled as to advance injection timing in accordance with an increase in engine load within the specific operating range.

This arrangement makes it possible to properly adjust the state of mixture distribution according to the engine load even in the operating range in which one-time injection is made during the compression stroke.

If the mode of fuel injection is switched in accordance with engine load increase as in the fashion, it becomes possible to increase the amount of retard of ignition timing and this serves to increase the HC and NOx reduction and quick light-off effects.

In a preferable form of the invention, a cavity for capturing a mixture is formed in the top surface of a piston which is fitted in a cylinder bore and forms the bottom surface of the combustion chamber, a fuel spray injected from the injector is directed to the cavity when the piston is in the proximity of its top dead center, and the injector and cavity are arranged such that the fuel injected from the injector and bounced off the cavity reaches the vicinity of a spark plug.

This construction provides desirable mixture stratification when one-time injection is made during the compression stroke, for example.

As this invention may be embodied in several forms without departing from the spirit of essential characteristics of the invention, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A control device for a direction injection engine having a catalyst provided in an exhaust passage for converting exhaust gases and an injector for injecting fuel directly into a combustion chamber, the control device comprising:
   a temperature state identifier for judging the temperature state of the catalyst;
   a water temperature sensor for detecting a temperature of engine cooling water;
   a load condition detector for sensing engine load condition; and
   a fuel injection for controlling fuel injection from the injector, the fuel injection controller performing quick light-off control operation by causing the injector to inject fuel in a one-time injection mode during a compression stroke in a specific low-load operating range of the engine when the catalyst is in its unheated state where its temperature is below its activation temperature and when the engine is in its unheated state where the temperature of the engine cooling water is below a certain temperature level, and switching the mode of fuel injection to intake-compression stroke split injection mode which includes earlier injection made during an intake stroke and later injection made during the compression stroke in a specific high-load operating range of the engine, based on judgment results of the temperature state identifier, detected result of the water temperature and sensing results of the load condition detector and for controlling the amount of the fuel injection during the quick light-off control operating such that the mean air-fuel ratio in the combustion chamber is set within a rage of 13 to 17 in the individual injection modes including the one-time injection mode in the compression stroke and the intake-compression stroke split injection mode.

2. The control device for a direct injection engine according to claim 1, wherein the fuel injection controller controls the injector to make split injection during the compression stroke in an engine operating range lying between the low-load operating range, in which fuel injection from the injector is made at one time during the compression stroke, and the high-load operating range, in which intake-compression stroke split injection is made, during the quick light-off control operation.

3. The control device for a direct injection engine according to claim 1, wherein the fuel injection during the quick light-off control operation is made with the mean air-fuel ratio set within a range of 13 to 17 in the individual injection modes including the one-time injection mode in the compression stroke and the intake-compression stroke split injection mode.

4. The control device for a direct injection engine according to claim 3, wherein fuel injection during the quick light-off control operation is made in the individual injection modes including the one-time injection mode in the compression stroke and the intake-compression stroke split injection mode in such a way that the mean air-fuel ratio becomes equal to or smaller than the stoichiometric air-fuel ratio in an inner region around a spark plug and becomes larger than the stoichiometric air-fuel ratio in an outer region around the inner region.

5. The control device for a direct injection engine according to claim 4, wherein the switching of the mode of fuel injection in accordance with an increase in engine load during the quick light-off control operation varies the concentration of the mixture in an outer peripheral part of the combustion chamber in such a way that the mixture becomes richer within a range in which the air-fuel ratio of the mixture is higher than the stoichiometric air-fuel ratio.

6. The control device for a direct injection engine according to claim 4, wherein the switching of the mode of fuel injection in accordance with an increase in engine load during the quick light-off control operation varies the concentration of the mixture in the inner region around the spark plug in such a way that the mixture becomes leaner within a range in which the air-fuel ratio of the mixture is equal to or lower than the stoichiometric air-fuel ratio.

7. The control device for a direct injection engine according to claim 4, wherein one-time injection made in the specific operating range during the compression stroke in the quick light-off control operation is so controlled as to advance injection timing in accordance with an increase in engine load within the specific operating range.

8. The control device for a direct injection engine according to claim 1, wherein the control device further comprises an ignition timing controller for retarding engine ignition timing by a specified amount during the quick light-off control operation.

9. The control device for a direct injection engine according to claim 1, wherein a cavity for capturing a mixture is formed in the top surface of a piston which is fitted in a cylinder bore and forms the bottom surface of the combustion chamber, a fuel spray injected from the injector is directed to the cavity when the piston is in the proximity of its top dead center, and the injector and cavity are arranged such that the fuel injected from the injector and bounced off the cavity reaches the vicinity of a spark plug.

10. A control device for a direct injection engine having a catalyst provided in an exhaust passage for converting exhaust gases and an injector for injecting fuel directly into a combustion chamber, the control device comprising:

a temperature state identifier for judging the temperature state of the catalyst;

a load condition detector for sensing engine load conditions; and a fuel injection controller for controlling fuel injection from the injector, the fuel injection controller performing quick light-off control operation by causing the injector to inject fuel in one-time injection mode during a compression stroke in a specific low-load operating range of the engine when the catalyst is in its unheated state where its temperature is below its activation temperature, and switching the mode of fuel injection to intake-compression stroke split injection mode which includes earlier injection made during an intake stroke and later injection made during the compression stroke in a specific high-load operating range of the engine, based on judgment results of the temperature state identifier and sensing results of the load condition detector;

wherein fuel injection during the quick light-off control operation is made with the mean air-fuel ratio set within a range of 13 to 17 in the individual injection modes including the one-time injection mode in the compression stroke and the intake-compression stroke split injection mode; such that the mean air-fuel ratio becomes equal to or smaller than the stoichiometric air-fuel ratio in an inner region around a spark plug and becomes larger than the stoichiometric air-fuel ratio in an outer region around the inner region, and the one-time injection made in the specific operating range during the compression stroke in the quick light-off control operation is so controlled as to advance injection timing in accordance with an increase in engine load within the specific operating range.

11. A control device for a direct injection engine having a catalyst provided in an exhaust passage for converting exhaust gases and an injector for injecting fuel directly into a combustion chamber, the control device comprising:

a temperature state identifier for judging the temperature state of the catalyst;

a load condition detector for sensing engine load conditions; and a fuel injection controller for controlling fuel injection from the injector, the fuel injection controller performing quick light-off control operation by causing the injector to inject fuel in a one-time injection mode during a compression stroke in a specific low-load operating range of the engine when the catalyst is in its unheated state where its temperature is below its activation temperature, advancing injection timing in accordance with an increase in engine load within the specific operating range, and switching the mode of fuel injection to intake-compression stroke split injection mode which includes earlier injection made during an intake stroke and later injection made during the compression stroke in a specific high-load operating range of the engine, based on judgment results of the temperature state identifier and sensing results of the load condition detector.

* * * * *